(12) United States Patent
Rudolph

(10) Patent No.: US 7,773,735 B2
(45) Date of Patent: Aug. 10, 2010

(54) ROUTE INFORMATION MESSAGE FOR DELIVERY OF PREPAID FLEXIBLE ALERTING CALL

(75) Inventor: Michael Joseph Rudolph, Naperville, IL (US)

(73) Assignee: Alcatel-Lucent USA Inc., Murray Hill, NJ (US)

(*) Notice: Subject to any disclaimer, the term of this patent is extended or adjusted under 35 U.S.C. 154(b) by 1246 days.

(21) Appl. No.: 11/199,687

(22) Filed: Aug. 9, 2005

(65) Prior Publication Data

US 2007/0041533 A1 Feb. 22, 2007

(51) Int. Cl.
*H04M 15/00* (2006.01)
*H04M 3/42* (2006.01)
*H04M 11/00* (2006.01)

(52) U.S. Cl. .............................. 379/114.2; 379/114.05; 379/211.04; 455/406; 455/414.1

(58) Field of Classification Search ............ 379/114.01, 379/114.05, 114.15, 114.17, 114.2, 114.21, 379/114.28, 114.29, 127.02, 127.06, 201.01, 379/201.02, 202.01, 211.04, 221.09, 221.14; 455/405–408, 414.1
See application file for complete search history.

(56) References Cited

U.S. PATENT DOCUMENTS

| 5,960,069 | A | * | 9/1999 | Felger | 379/114.01 |
| 7,260,384 | B2 | * | 8/2007 | Bales et al. | 455/413 |
| 7,277,735 | B1 | * | 10/2007 | Oh et al. | 455/567 |
| 2001/0051931 | A1 | * | 12/2001 | Schweitzer | 705/65 |
| 2002/0101966 | A1 | * | 8/2002 | Nelson | 379/114.01 |
| 2003/0063733 | A1 | * | 4/2003 | Levine et al. | 379/211.04 |
| 2009/0225975 | A1 | * | 9/2009 | Han | 379/211.04 |

* cited by examiner

*Primary Examiner*—Quoc D Tran
(74) *Attorney, Agent, or Firm*—Carmen Patti Law Group, LLC

(57) ABSTRACT

A plurality of route information messages that correspond to a plurality of telecommunication devices are sent to a prepaid service control point for delivery of a prepaid flexible alerting call.

20 Claims, 6 Drawing Sheets

ROUTE INFORMATION MESSAGE FOR DELIVERY OF PREPAID FLEXIBLE ALERTING CALL

TECHNICAL FIELD

The invention relates generally to telecommunications and more particularly to flexible alerting calls.

BACKGROUND

In telecommunication networks, many subscribers have several telecommunication devices such as landline and mobile phones. Flexible alerting allows for the subscriber to be reached by dialing a single pilot number that can ring a plurality of telecommunication devices. For example, by dialing a single-user pilot number, a subscribers mobile phone, work phone, or home phone can be connected to an incoming call based on whichever phone is answered first. In another example, the telecommunication devices for several members of a technical support team can be contacted by dialing a multi-user pilot number for the technical support team.

Known flexible alerting procedures require a billing record to be created after an incoming call has been completed. However, a prepaid service employs an incompatible real-time or near real-time billing for incoming calls. For example, the prepaid service must determine a billing rate for the incoming call before the incoming call has been connected. Since a flexible alerting call may be connected to any of a plurality of telecommunication devices, the billing rate is unknown until after a connection has been made.

Thus, a need exists for an increase in compatibility of flexible alerting with prepaid subscriber accounts.

SUMMARY

Flexible alerting allows for a subscriber to be reached by dialing a single pilot number that can ring a plurality of telecommunication devices. If the subscriber is a prepaid subscriber, a prepaid service control point must be configured to handle billing records for flexible alerting calls.

In one embodiment, there is provided a method for sending, to a prepaid service control point, a plurality of route information messages that correspond to a plurality of telecommunication devices for delivery of a prepaid flexible alerting call.

In another embodiment, there is provided an apparatus comprising a mobile switching center that receives a prepaid flexible alerting call. The mobile switching center is configured to send to a prepaid service control point a plurality of route information messages that correspond to a plurality of telecommunication devices for delivery of the prepaid flexible alerting call.

In yet another embodiment, there is provided an article comprising one or more computer-readable signal-bearing media. The article comprises means in the one or more media for sending, to a prepaid service control point, a plurality of route information messages that correspond to a plurality of telecommunication devices for delivery of a prepaid flexible alerting call.

DESCRIPTION OF THE DRAWINGS

Features of exemplary implementations of the invention will become apparent from the description, the claims, and the accompanying drawings in which:

DETAILED DESCRIPTION

Figure 1:
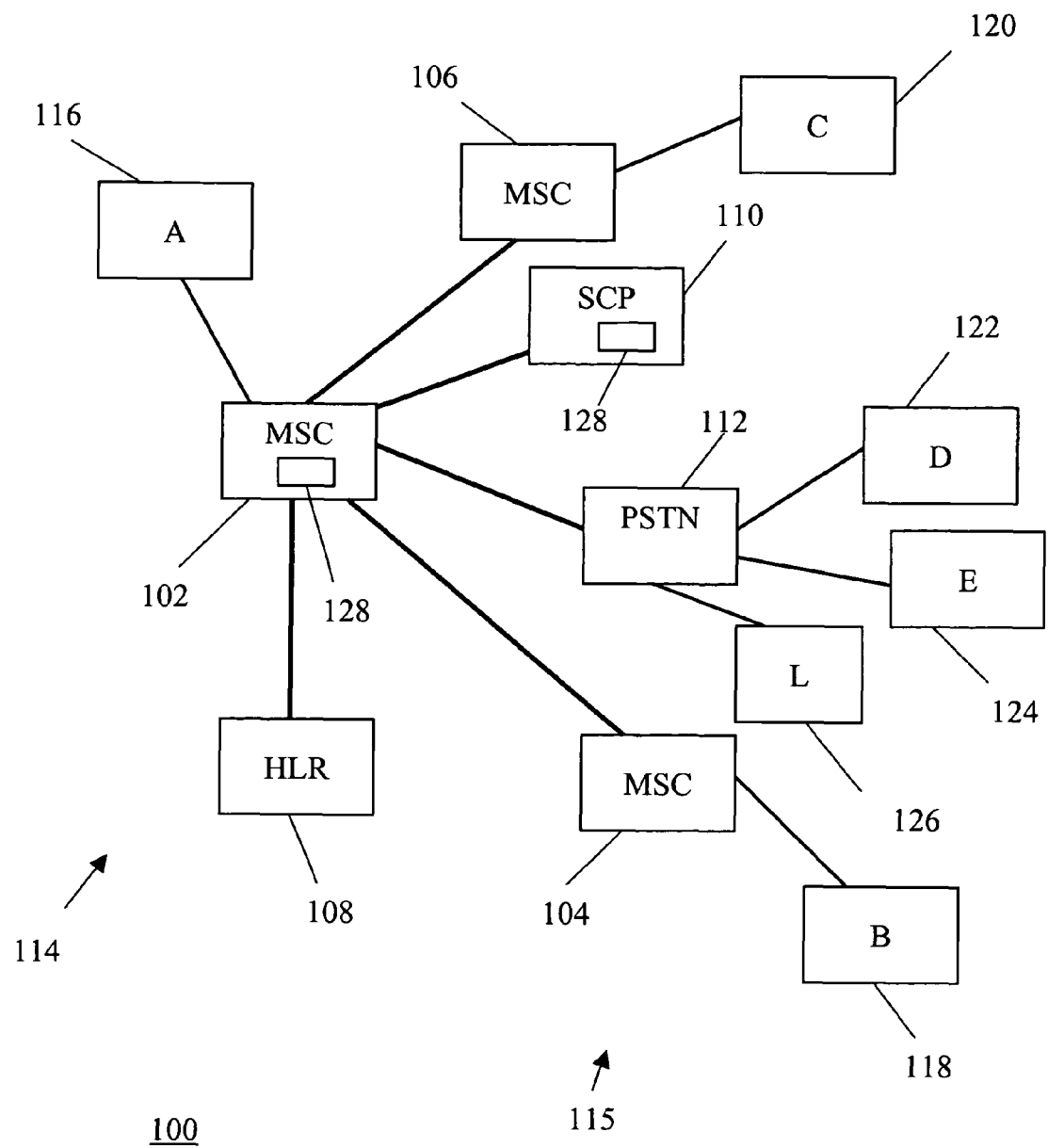
FIG. 1 is a representation one implementation of an apparatus that comprises one or more mobile switching centers, a home location register, a public switched telephone network, and a service control point.

Turning to FIG. 1, an apparatus 100 in one embodiment comprises one or more mobile switching centers 102, 104 and 106 ("MSCs"), a home location register 108 ("HLR"), a service control point 110 ("SCP"), and a public switched telephone network 112 ("PSTN"). The mobile switching centers 102 and 104, the home location register 108, and the service control point 110 in one example comprise a portion of a cellular telecommunication network 114, for example, a code division multiple access ("CDMA"), time division multiple access ("TDMA"), or advanced mobile phone service ("AMPS") network that employ ANSI-41 signaling. The cellular telecommunication network 114 provides a mobile phone service to a plurality of cellular subscribers. The service control point 110 in one example comprises a prepaid service control point for providing a prepaid mobile phone service to one or more of the plurality of cellular subscribers. For example, the mobile switching center 102 and the service control point 110 cooperate to provide a prepaid flexible alerting service to a prepaid flexible alerting subscriber. Prepaid mobile phone service is described in Telecommunications Industry Association standard 826 ("TIA-826"). One or more of the mobile switching center 102 and the service control point 110 in one example comprise an instance of a recordable data storage medium 128, as described herein.

The cellular telecommunication network 114 provides a single- and/or multi-user flexible alerting service to a pilot number that corresponds to the prepaid flexible alerting subscriber. For example, the pilot number corresponds to a plurality of telecommunication devices 115. In one example for a single-user flexible alerting subscriber, the pilot number corresponds to different telecommunication devices of the same flexible alerting subscriber, for example, a personal mobile telephone, a work phone, and a home phone. In another example for a multi-user flexible alerting subscriber, the pilot number corresponds to different telecommunication devices that belong to different users. For example, the plurality of telecommunication devices 115 correspond to a technical support group.

The plurality of telecommunication devices 115 in one example comprises telecommunication devices 116, 118, 120, 122 and 124. The telecommunication devices 116, 118 and 120 in one example comprise mobile phones that are homed at the mobile switching centers 102, 104 and 106, respectively. The telecommunication devices 122 and 124 in one example comprise PSTN terminated telecommunication devices. The telecommunication devices 116, 118, 120, 122 and 124 comprise dialed numbers for receiving a call, for example, "A", "B", "C", "D" and "E", respectively. A telecommunication device 126 ("L") dials the pilot number "A" to reach the prepaid flexible alerting subscriber.

Figure 2:
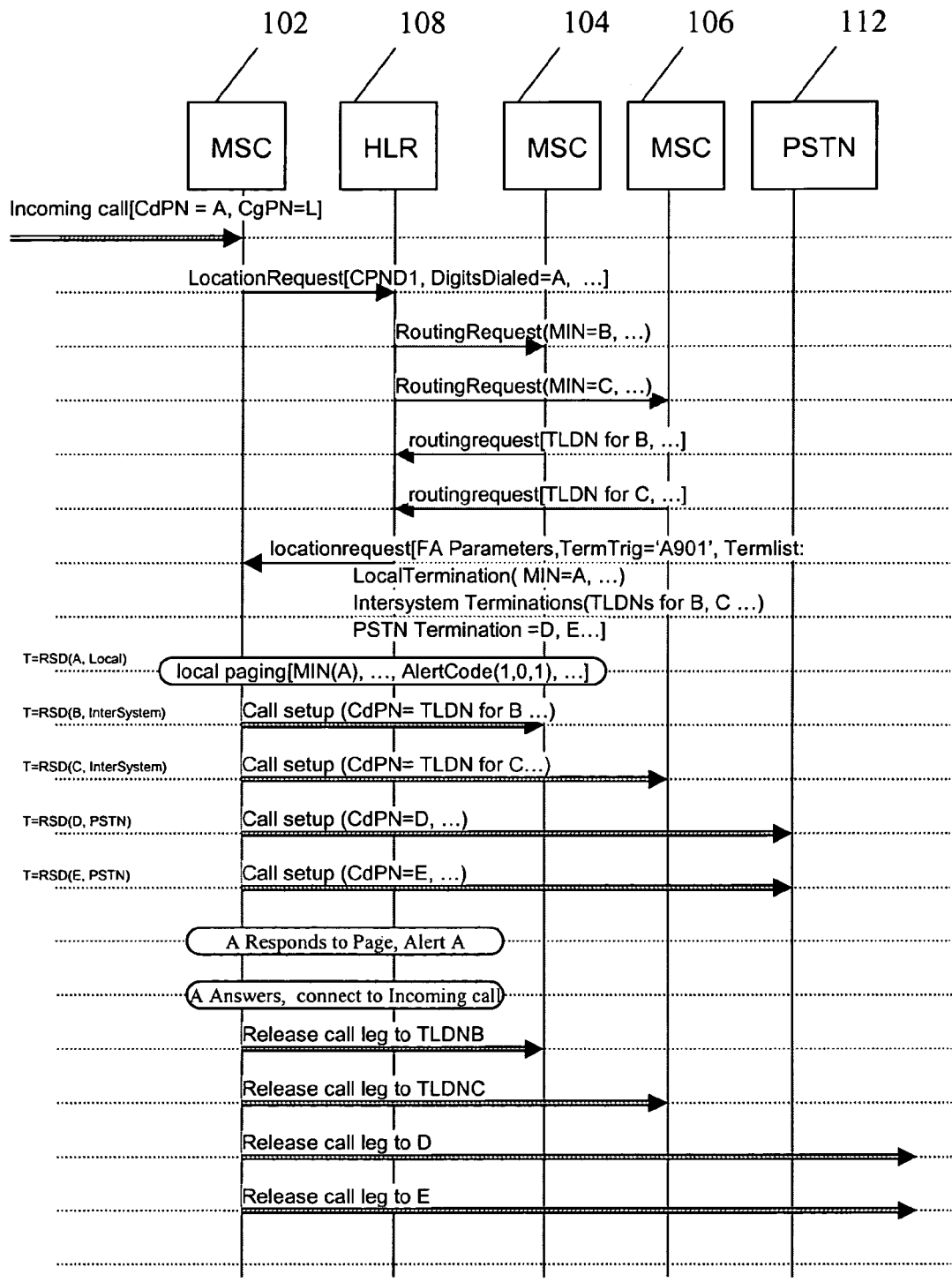
FIG. 2 is a representation of a prior art message flow for flexible alerting of the apparatus of FIG. 1.

Turning to FIG. 2, message flow 202 comprises an exemplary prior art call flow for a flexible alerting call. The home location register 108 receives a LocationRequest message and determines that the dialed number "A" is activated for a flexible alerting call. The home location register 108 identifies the telecommunication devices 116, 118, 120, 122 and 124 as recipients for the flexible alerting call and obtains route information for a plurality of call legs to the telecommunication devices 116, 118, 120, 122 and 124.

The mobile switching center 102 receives the route information for the call legs from the home location register 108. After waiting for a predetermined time period for one or more of the call legs, the mobile switching center 102 initializes the call legs to the telecommunication devices 116, 118, 120, 122 and 124. The predetermined time period in one example comprises a ring start delay. When one of the telecommunication devices 116, 118, 120, 122 and 124 answers the call, for example, the telecommunication device 116, the mobile switching center 102 connects an incoming call leg for the flexible alerting call to the telecommunication device 116. The mobile switching center 102 releases unused call legs, for example, call legs to the telecommunication devices 118, 120, 122 and 124.

Figure 3:
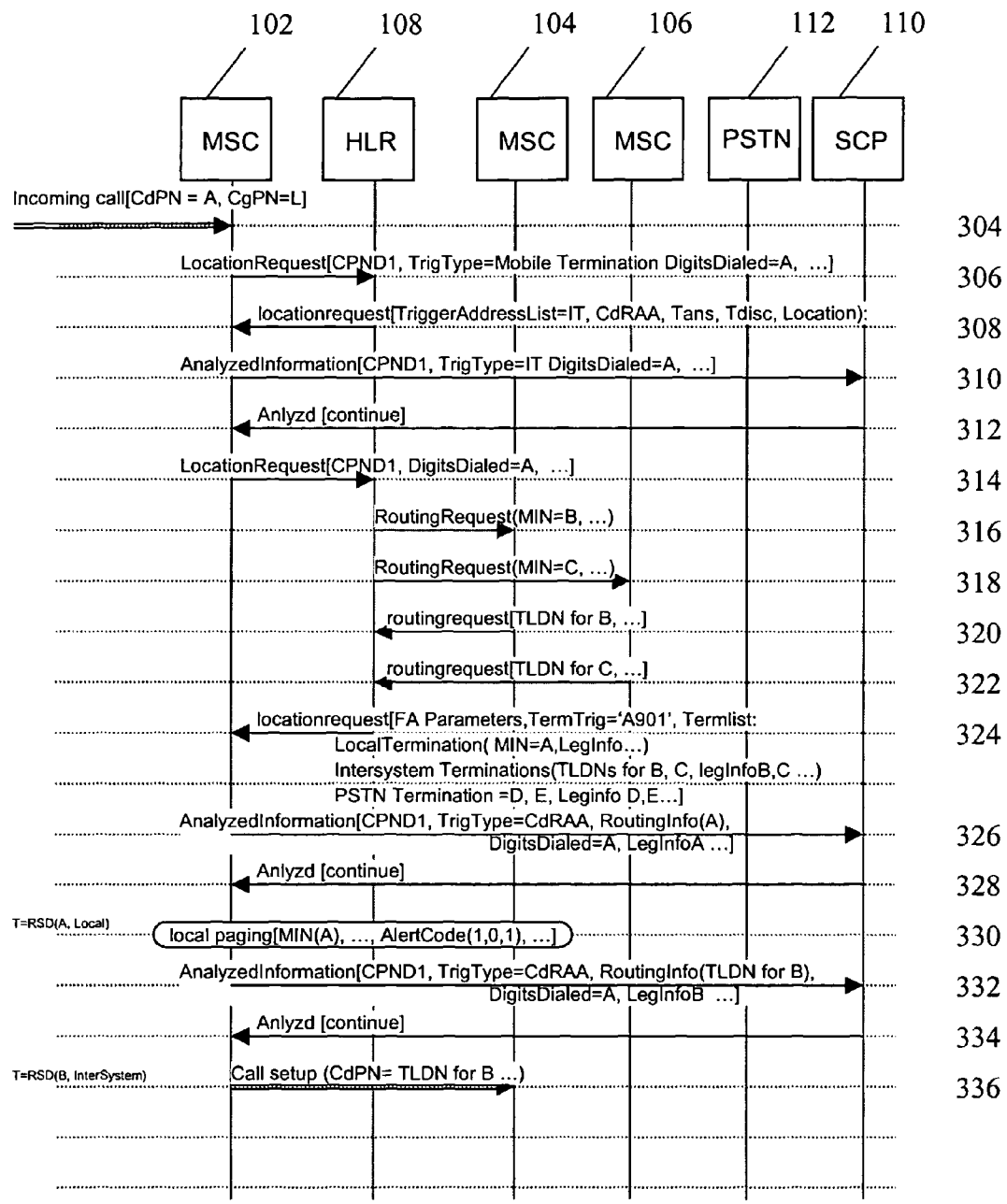
FIG. 3 is a representation of an exemplary message flow for prepaid flexible alerting of the apparatus of FIG. 1.
Figure 4:
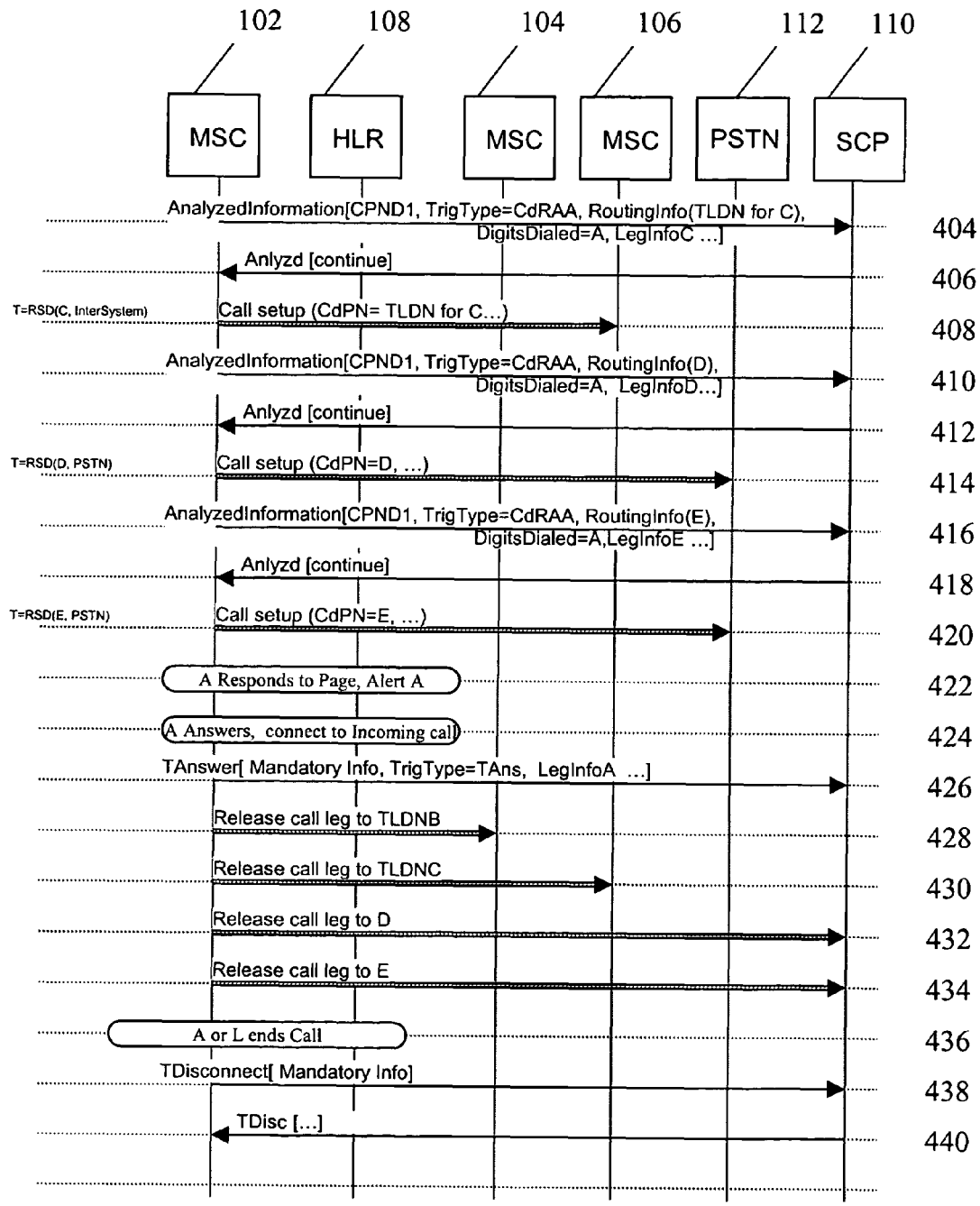
FIG. 4 is a continuation of the exemplary message flow of FIG. 3.

An illustrative description of an exemplary operation of the apparatus 100 is presented, for explanatory purposes. Turning to FIGS. 3 and 4, message flows 302 and 402 comprise an exemplary call flow for a prepaid flexible alerting call. The mobile switching center 102 receives (STEP 304) an incoming call request to connect an incoming call leg. The incoming call request comprises a called party number ("CdPN") for the pilot number "A" and a calling party number ("CgPN") for the telecommunication device 106 ("L"). The mobile switching center 102 sends (STEP 306) a mobile termination LocationRequest message to the home location register 108. The home location register 108 receives the LocationRequest message and determines that there are one or more triggers associated with the prepaid flexible alerting subscriber. The home location register 108 sends (STEP 308) a trigger message to the mobile switching center 102 with an indication to arm an initial termination trigger, a called party routing address available trigger, an answer trigger, and a disconnect trigger. In one example, the trigger message further comprises an indication to arm a location trigger. In another example, the mobile switching center arms the location trigger without the indication.

Upon receipt of the initial termination trigger from the trigger message, the mobile switching center 102 sends an AnalyzedInformation message to the service control point to indicate that a termination attempt has been made on behalf of the prepaid flexible alerting subscriber. The service control point 110 checks an account balance for the prepaid flexible alerting subscriber and sends (STEP 312) a continue message to the mobile switching center 102 if the account balance is sufficient. Upon receipt of the continue message, the mobile switching center 102 sends (STEP 314) a LocationRequest message to the home location register 108.

The home location register 108 determines that the LocationRequest is for a flexible alerting subscriber and prepares a return result for the LocationRequest. The return result in one example comprises a plurality of call leg route parameters and a plurality of call leg identifiers that correspond to the telecommunication devices 116, 118, 120, 122 and 124. The return result in a further example comprises one or more flexible alerting parameters. Since the telecommunication device 116 is homed at the mobile switching center 102, the return result comprises a LocalTermination parameter for the telecommunication device 116. The telecommunication devices 118 and 120 are homed in the mobile switching centers 104 and 106. The home location register 108 sends (STEP 316) a RoutingRequest message with a mobile identification number of the telecommunication device 118 to the mobile switching center 104. The mobile switching center 104 responds (STEP 320) with a temporary local directory number for the telecommunication device 118. The home location register 108 sends (STEP 318) a RoutingRequest message with a mobile identification number of the telecommunication device 120 to the mobile switching center 104. The mobile switching center 104 responds (STEP 322) with a temporary local directory number for the telecommunication device 120.

The home location register 108 in one example creates the return result with the one or more flexible alerting parameters, a termination trigger, the plurality of call leg route parameters, and a plurality of call leg identifiers that correspond to the telecommunication devices 116, 118, 120, 122 and 124. The return result in one example comprises: a local termination parameter with a mobile identification number "A" and a call leg identifier LegInfoA that correspond to the telecommunication device 116; an intersystem termination parameter with the temporary local directory number and a call leg identifier LegInfoB that correspond to the telecommunication device 118; an intersystem termination parameter with the temporary local directory number and a call leg identifier LegInfoC that correspond to the telecommunication device 120; a PSTN termination parameter with the dialed number "D" and a call leg identifier LegInfoD that correspond to the telecommunication device 122; and a PSTN termination parameter with the dialed number "E" and a call leg identifier LegInfoE that correspond to the telecommunication device 124. In another example, the home location register 108 creates the return result without the plurality of call leg identifiers.

The home location register 108 sends (STEP 324) the return result to the mobile switching center 102. The mobile switching center 102 sends (STEPS 326, 332, 404, 410, and 416) a plurality of route information messages to the service control point 110. STEPS 326, 332, 404, 410, and 416 in one example occur substantially at a same time. The mobile switching center 102 sends one route information message for each of the plurality of telecommunication devices 115. The route information messages in one example comprise a called routing address available trigger, a routing information parameter, and the call leg identifiers that correspond to the telecommunication devices 116, 118, 120, 122 and 124. In another example, the route information messages comprise the called routing address available trigger and the routing information parameter.

The service control point 110 in one example determines a plurality of ratings for the plurality of call legs through employment of the route information messages, for example, a plurality of billing rates. In a first example, the service control point 110 determines a rating for the call leg to the telecommunication device 116 based on the local termination parameter with the mobile identification number "A". In a second example, the service control point 110 determines a rating for the call leg to the telecommunication device 120 based on the intersystem termination parameter with the temporary local directory number that corresponds to the telecommunication device 120. The plurality of ratings correspond to the plurality of telecommunication devices 115. Upon the determination of the ratings, the service control point 110 sends (STEPS 328, 334, 406, 412 and 418) a plurality of confirmation messages to the mobile switching center 102. In one example where the rating for the call leg is sufficient to handle the prepaid flexible alerting call, the confirmation message comprises an analyzed information return result with parameters indicating a continue. In another example where the rating for the call leg is not sufficient, the confirmation message comprises an analyzed information return result with action code parameter indicating a disconnect or redirect.

Upon receipt of the plurality of confirmation messages, the mobile switching center 102 initializes (STEPS 330, 336, 408, 414, and 420) one or more of the plurality of call legs, for example, the call legs with a corresponding continue message. The mobile switching center 102 in one example waits to receive each of the plurality of confirmation messages before initializing any of the call legs. In another example, the mobile switching center 102 waits for a predetermined time period before initializing one or more of the call legs to promote a notification for the prepaid flexible alerting call at the plurality of telecommunication devices 115 at a substantially same time. For example, the mobile switching center 102 employs a ring start delay so that each of the telecommunication devices 116, 118, 120, 122 and 124 starts ringing at approximately a same time.

When one of the plurality of telecommunication devices 115 answers (STEP 422) the prepaid flexible alerting call, for example, the telecommunication device 116, the mobile switching center 102 selects and connects (STEP 424) the call leg that corresponds to the telecommunication device 116 to the incoming call leg. The mobile switching center 102 sends (STEP 426) an answer message to the service control point 110. The answer message in one example comprises the call leg identifier of the telecommunication device that answers the prepaid flexible alerting call, for example, the call leg identifier "LegInfoA". In another example, the answer message comprises the routing information for the telecommunication device that answers the prepaid flexible alerting call. The service control point 110 employs the call leg identifier and/or the routing information parameter to apply the rating that corresponds to the telecommunication device that answered the prepaid flexible alerting call. In another example, the service control point 110 performs a determination of the rating for the prepaid flexible alerting call upon receipt of the answer message in STEP 426. For example, the service control point 110 performs a single rating determination after selection of the call leg instead of the plurality of determinations before the selection of the call leg.

Upon the connection of the telecommunication device 116 to the incoming call leg, the mobile switching center 102 releases unused call legs. For example, the mobile switching center 102 releases (STEPS 428, 430, 432, 434) the call legs to the telecommunication devices 118, 120, 122 and 124. STEPS 428, 430, 432, and 434 in one example occur at a substantially same time. The prepaid flexible alerting call can be disconnected when either the calling party or the called party hangs up. When one party hangs up (STEP 436), the mobile switching center 102 sends (STEP 438) a disconnect message to the service control point to stop billing for the prepaid flexible alerting call. The service control point 110 sends (STEP 440) a disconnect confirmation message to the mobile switching center 102 to confirm completion of billing for the prepaid flexible alerting call.

Figure 5:
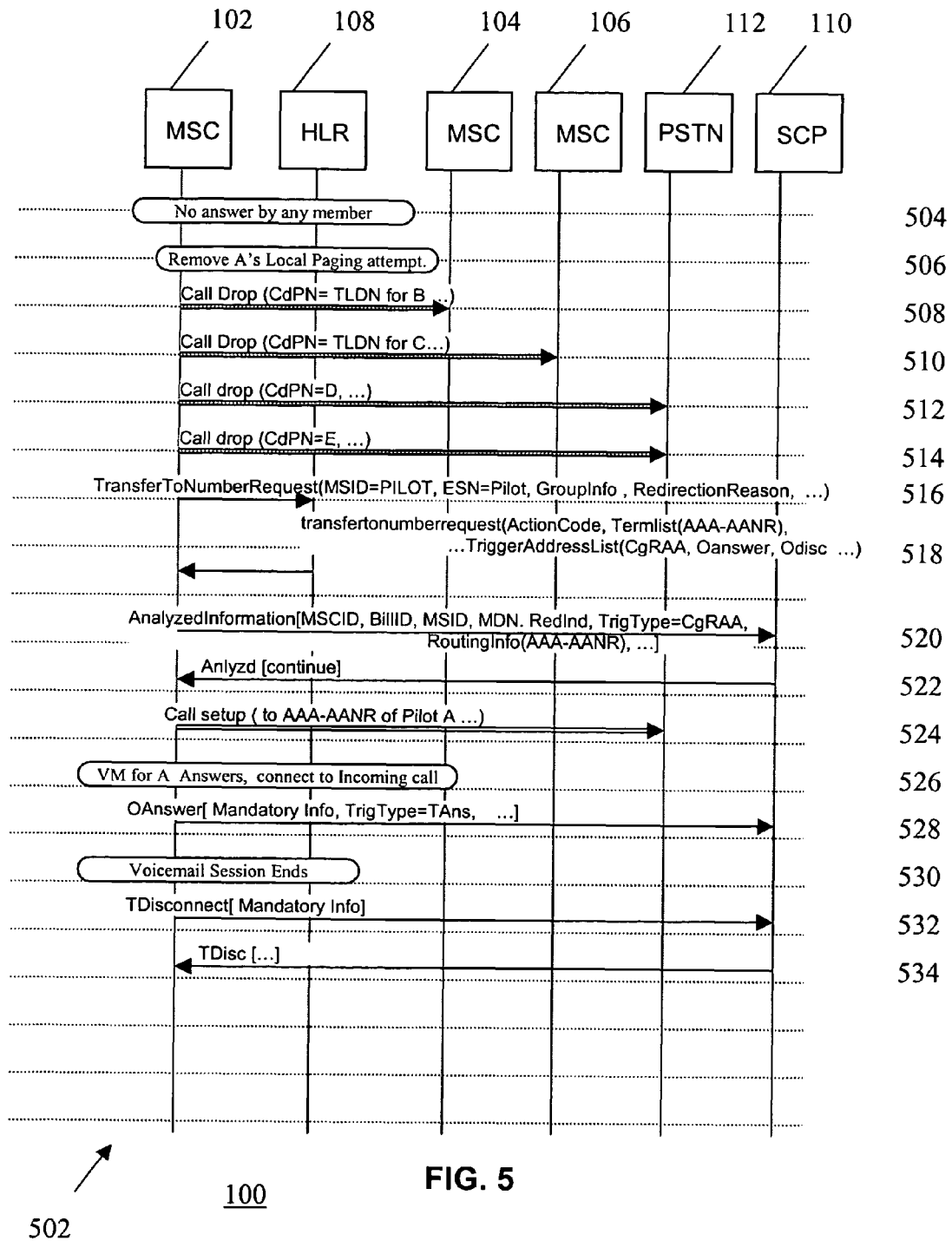
FIG. 5 is a representation of an exemplary message flow for flexible alerting of the apparatus of FIG. 1 illustrating a no answer condition.

Turning to FIG. 5, message flow 502 comprises an exemplary call flow after STEP 420 of FIG. 4. If none of the plurality of telecommunication devices 115 answer (STEP 504) the prepaid flexible alerting call, the mobile switching center 102 performs a secondary treatment to the call such as transferring to voice mail or a forwarding number. The mobile switching center 102 in one example drops (STEPS 506, 508, 510, 512 and 514) the call legs to the plurality of telecommunication devices 115. The mobile switching center 102 sends (STEP 516) a TransferToNumberRequest to the home location register 108. The TransferToNumberRequest comprises a GroupInfo parameter to indicate a NoneReachable trigger. The home location register 108 responds (STEP 518) to the TransferToNumberRequest with a return result that comprises CgRAA, Oanswer, and Odisc triggers to enable charging for redirection of the prepaid flexible alerting call.

The mobile switching center 102 sends (STEP 520) an AnalyzedInformation message to the service control point 110 that comprises routing information for the redirection. The service control point 110 employs the routing information to determine a rating for the redirection and sends (STEP 522) a continue message to the mobile switching center 102. The mobile switching center 102 in one example initializes (STEP 524) a call leg to a voice mail service for the prepaid flexible alerting subscriber. The voice mail service answers (STEP 526) and the mobile switching center 102 sends (STEP 528) an answer message to the service control point 110 to begin billing for the call. The calling party or the voice mail service ends (STEP 530) the call. The mobile switching center 102 sends (STEP 532) a disconnect message to the service control point 110 to stop billing the call. The service control point 110 stops billing the call and sends (STEP 534) a confirmation message to the mobile switching center 102.

Figure 6:
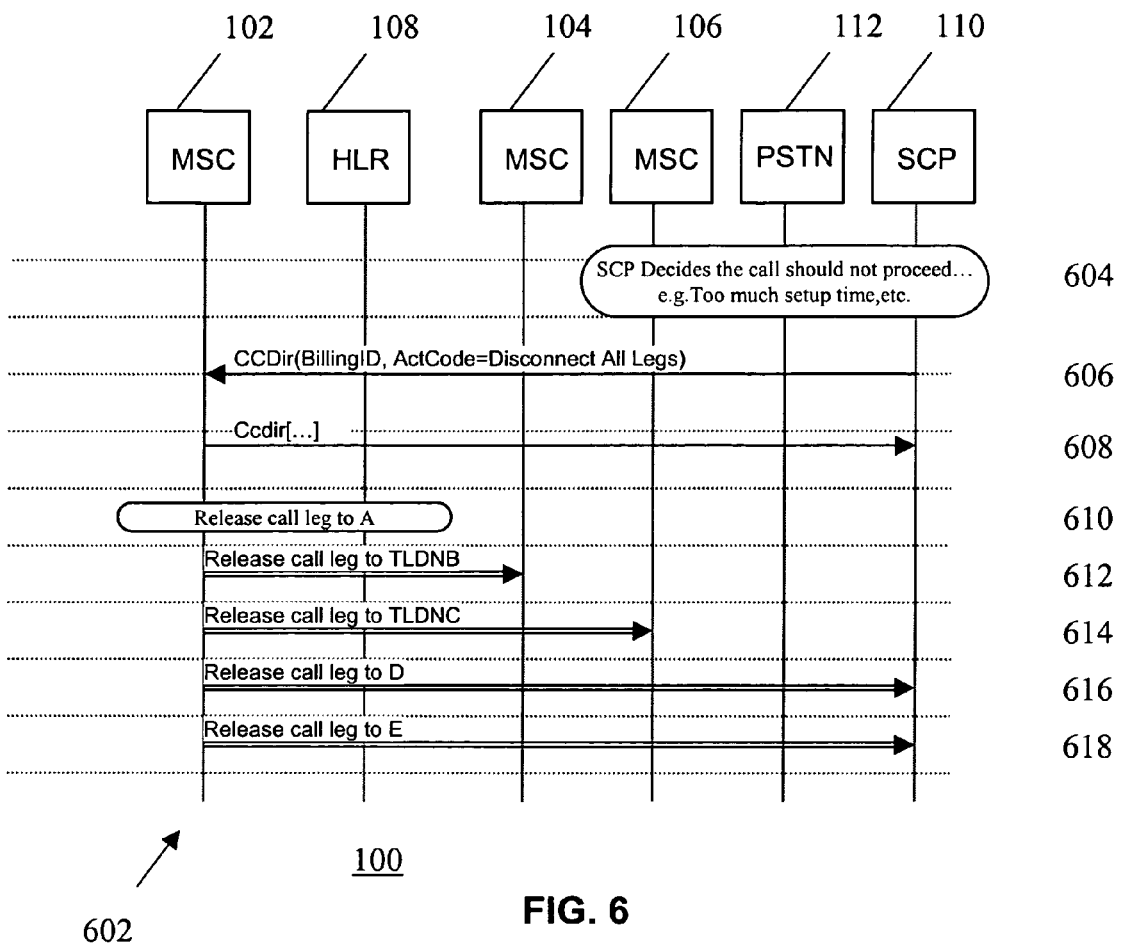
FIG. 6 is a representation of an exemplary message flow for flexible alerting of the apparatus of FIG. 1 illustrating a teardown before answer condition.

Turning to FIG. 6, message flow 602 comprises an exemplary call flow before STEP 422 of FIG. 4. The service control point 110 in one example ends the prepaid flexible alerting call before the one of the plurality of telecommunication devices 115 answers (STEP 422) the prepaid flexible alerting call. For example, if the service control point 110 determines (STEP 604) that the call setup of the prepaid flexible alerting call is over a predetermined time limit or does not receive a response, the service control point 110 sends (STEP 606) a call control directive message to the mobile switching center 102. The call control directive message in one example comprises an identifier of the prepaid flexible alerting call and an action code to disconnect all of the call legs. The identifier in one example comprises a billing ID for the prepaid flexible alerting call. Upon receipt of the call control directive message, the mobile switching center 102 releases (STEPS 610, 612, 614, 616, 618) the call legs to the plurality of telecommunication devices 115.

The apparatus 100 in one example comprises a plurality of components such as one or more of electronic components and computer software components. A number of such components can be combined or divided in the apparatus 100. An exemplary component of the apparatus 100 employs and/or comprises a set and/or series of computer instructions written in or implemented with any of a number of programming languages, as will be appreciated by those skilled in the art.

The apparatus 100 in one example employs one or more computer-readable signal-bearing media. The computer-readable signal-bearing media store software, firmware and/or assembly language for performing one or more portions of one or more implementations of the invention. Examples of a computer-readable signal-bearing medium for the apparatus 100 comprise the recordable data storage medium 128 of the mobile switching center 102 and the recordable data storage medium 128 of the service control point 110. The computer-readable signal-bearing medium for the apparatus 100 in one example comprise one or more of a magnetic, electrical, optical, biological, and atomic data storage medium. For example, the computer-readable signal-bearing medium comprise floppy disks, magnetic tapes, CD-ROMs, DVD-ROMs, hard disk drives, and electronic memory. In another example, the computer-readable signal-bearing medium comprises a network comprising or coupled with the apparatus 100, for instance, one or more of a telephone network, a local area network ("LAN"), a wide area network ("WAN"), the Internet, and a wireless network. The network is configured for transmission of a modulated carrier signal.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

I claim:

1. A method, comprising the steps of:
   receiving an incoming call request at an originating mobile switching center of a code division multiple access (CDMA) cellular network, wherein the incoming call request is for a prepaid flexible alerting call to a pilot number of a prepaid cellular subscriber served by the originating mobile switching center;
   arming, by the originating mobile switching center, one or more prepaid triggers for the prepaid flexible alerting call;
   receiving, at the originating mobile switching center, a call leg identifier and route information for each call leg of a plurality of call legs, wherein the plurality of call legs correspond to a respective plurality of telecommunication devices associated with the prepaid cellular subscriber account for delivery of the prepaid flexible alerting call;
   sending, from the originating mobile switching center, to a prepaid service control point of the CDMA cellular network, a plurality of route information messages that correspond to the plurality of call legs;
   initializing each call leg of one or more confirmed call legs with the one or more prepaid triggers for delivery of the prepaid flexible alerting call, wherein the plurality of call legs comprises the one or more confirmed call legs.

2. The method of claim 1, further comprising the step of:
   receiving, from a home location register of the CDMA cellular network, the one or more prepaid triggers for the prepaid flexible alerting call, wherein the one or more triggers comprise an initial Termination (IT) trigger, a called party muting address available (CdRAA) trigger, an answer trigger, and a disconnect trigger;
   wherein the step of receiving the call leg identifier and route information comprises the step of:
   receiving, from the home location register, one or more route information messages, wherein the route information messages comprise the route information and the call leg identifiers for the plurality of call legs.

3. The method of claim 2, further comprising the step of:
   sending, to the prepaid service control point and in response to the answer trigger, an answer message with the call leg identifier, of the plurality of call leg identifiers, that corresponds to an answered call leg for billing of the prepaid flexible alerting call;
   connecting the answered call leg to an incoming call leg for the prepaid flexible alerting call; and
   releasing unused call legs of the one or more confirmed call legs.

4. The method of claim 1, further comprising the step of:
   receiving, by the originating mobile switching center, a call control directive message from the prepaid service control point to cause a release of the one or more call legs for the one or more of the plurality of telecommunication devices.

5. The method of claim 2, wherein the step of sending the plurality of route information messages comprises the steps of:
   sending, to the prepaid service control point and in response to the CdRAA trigger, an AnalyzedInformation messages for each call leg of the plurality of call legs, wherein the AnalyzedInformation messages comprise the call leg identifiers and route information for each call leg or the plurality of call legs; and
   receiving, from the prepaid service control point, one or more confirmation messages that correspond to the one or more confirmed call legs, wherein the prepaid service control point selects the one or more confirmed call legs from the plurality of call legs based on one or more ratings for the plurality of call legs and the route information.

6. The method of claim 1, wherein the step of arming the one or more prepaid triggers comprises the step of:
   arming, by the originating mobile switching center, one or more code division multiple access (CDMA) prepaid triggers for the prepaid flexible alerting call.

7. The method of claim 1, further comprising the steps of:
   sending a Transfer to Number Request message, by the originating mobile switching center and to the home location register, if there is no answer by the one or more confirmed call legs, wherein the Transfer to Number Request message comprises the pilot number and a GroupInfo parameter that indicates a NoneReachable trigger;
   receiving a transfer response message, at the originating mobile switching center and from the home location register, wherein the transfer response message comprises a call forwarding no reply number for the pilot number, a calling party routing address available trigger (CgRAA), an answer trigger, and a disconnect trigger;
   sending, to the prepaid service control point and in response to the CgRAA trigger, an Analyzed Information message with the call forwarding no reply number for the pilot number;
   initializing a call leg to the call forwarding no reply number with the answer trigger and the disconnect trigger.

8. An apparatus, comprising:
   an originating mobile switching center of a code division multiple access (CDMA) cellular network that receives an incoming call request for a prepaid flexible alerting call to a pilot number of a prepaid cellular subscriber served by the originating mobile switching center;
   wherein the originating mobile switching center is configured to arm one or more prepaid triggers for the prepaid flexible alerting call;
   wherein the originating mobile switching center is configured to receive a call leg identifier and route information for each call leg of a plurality of call legs, wherein the plurality of call legs correspond to a respective plurality of telecommunication devices associated with the prepaid cellular subscriber account for delivery of the prepaid flexible alerting call;
   wherein the originating mobile switching center is configured to send, to a prepaid service control point of the CDMA cellular network, a plurality of route information messages that correspond to the plurality of call legs;

wherein the originating mobile switching center is configured to initialize each call leg of one or more confirmed call legs with the one or more prepaid triggers for delivery of the prepaid flexible alerting call, wherein the plurality of call legs comprises the one or more confirmed call legs.

9. The apparatus of claim 8, wherein the originating mobile switching center is configured to receive the one or more prepaid triggers for the prepaid flexible alerting call from a home location register of the CDMA cellular network, wherein the one or more triggers comprise an Initial Termination (IT) trigger, a called party routing address available (CdRAA) trigger, an answer trigger, and a disconnect trigger;

wherein the originating mobile switching center is configured to receive, from the home location register, one or more route information messages, wherein the route information messages comprise the route information and the call leg identifiers for the plurality of call legs.

10. The apparatus of claim 9, wherein the mobile switching center is configured to receive an answer message that corresponds to a first telecommunication device of the one or more of the plurality of telecommunication devices and a first call leg of the one or more call legs;

wherein the mobile switching center is configured to send to the prepaid service control point a call leg identifier, of the plurality of call leg identifiers, that corresponds to the first call leg for billing of the prepaid flexible alerting call;

wherein the mobile switching center is configured to connect the first call leg to an incoming call leg for the prepaid flexible alerting call;

wherein the mobile switching center is configured to release unused call legs of the one or more call legs.

11. The apparatus of claim 8, wherein the prepaid service control point is configured to send a call control directive message to the mobile switching center to cause a release of the one or more call legs for the one or more of the plurality of telecommunication devices.

12. The apparatus of claim 9, wherein the originating mobile switching center is configured to send, to the prepaid service control point and in response to the CdRAA trigger, an AnalyzedInformation message for each call leg of the plurality of call legs, wherein the AnalyzedInformation messages comprise the call leg identifiers and route information for each call leg of the plurality of call legs;

wherein the originating mobile switching center is configured to receive, from the prepaid service control point, one or more confirmation messages that correspond to the one or more confirmed call legs, wherein the prepaid service control point selects the one or more confirmed call legs from the plurality of call legs based on one or more ratings for the plurality of call legs and the route information.

13. The apparatus of claim 8, wherein the one or more prepaid triggers comprise one or more code division multiple access (CDMA) prepaid triggers for the prepaid flexible alerting call.

14. The apparatus of claim 8, wherein the originating mobile switching center is configured to send a Transfer to Number Request message to the home location register if there is no answer by the one or more confirmed call legs, wherein the Transfer to Number Request message comprises the pilot number and a GroupInfo parameter that indicates a NoneReachable trigger, wherein the originating mobile switching center is configured to receive a transfer response message from the home location register, wherein the transfer response message comprises a call forwarding no reply number for the pilot number, a calling party routing address available trigger (CgRAA), an answer trigger, and a disconnect trigger;

wherein the originating mobile switching center is configured to send, to the prepaid service control point and in response to the CgRAA trigger, an Analyzed Information message with the call forwarding no reply number for the pilot number;

wherein the originating mobile switching center is configured to initialize a call leg to the call forwarding no reply number with the answer trigger and the disconnect trigger.

15. An article, comprising:

one or more computer-readable signal-bearing media; and means in the one or more media for receiving an incoming call request at an originating mobile switching center of a code division multiple access (CDMA) cellular network, wherein the incoming call request is for a prepaid flexible alerting call to a pilot number of a prepaid cellular subscriber served by the originating mobile switching center;

means in the one or more media for arming, by the originating mobile switching center, one or more prepaid triggers for the prepaid flexible alerting call;

means in the one or more media for receiving, at the originating mobile switching center, a call leg identifier and route information for each call leg of a plurality of call legs, wherein the plurality of call legs correspond to a respective plurality of telecommunication devices associated with the prepaid cellular subscriber account for delivery of the prepaid flexible alerting call;

means in the one or more media for sending, from the originating mobile switching center and to a prepaid service control point of the CDMA cellular network, a plurality of route information messages that correspond the plurality of call legs; and means in the one or more media for initializing each call leg of one or more confirmed call legs with the one or more prepaid triggers for delivery of the prepaid flexible alerting call, wherein the plurality of call legs comprises the one or more confirmed call legs.

16. The article of claim 15, further comprising:

means in the one or more media for receiving, from a home location register of the CDMA cellular network, the one or more prepaid triggers for the prepaid flexible alerting call, wherein the one or more triggers comprise an Initial Termination (IT) trigger, a called party routing address available (CdRAA) trigger, an answer trigger, and a disconnect trigger;

wherein the means in the one or more media for receiving the call leg identifier and route information comprises:

means in the one or more media for receiving, from the home location register, one or more route information messages, wherein the route information messages comprise the route information and the call leg identifiers for the plurality of call legs.

17. The article of claim 16, further comprising:

means in the one or more media for sending, to the prepaid service control point and in response to the answer trigger, an answer message with the call leg identifier, of the plurality of call leg identifiers, that corresponds to an answered call leg for billing of the prepaid flexible alerting call;

means in the one or more media for connecting the answered call leg to an incoming call leg for the prepaid flexible alerting call; and means in the one or more media for releasing unused call legs of the one or more confirmed call legs.

18. The article of claim 16, wherein the means in the one or more media for sending the plurality of route information messages comprises:

means in the one or more media for sending, to the prepaid service control point and in response to the CdRAA trigger, an AnalyzedInformation message for each call leg of the plurality of call legs, wherein the AnalyzedInformation messages comprise the call leg identifiers and route information for each call leg of the plurality of call legs; and means in the one or more media for receiving, from the prepaid service control point, one or more confirmation messages that correspond to the one or more confirmed call legs, wherein the prepaid service control point selects the one or more confirmed call legs from the plurality of call legs based on one or more ratings for the plurality of call legs and the mute information.

19. The article of claim 15, further comprising:

means in the one or more media for receiving, by the originating mobile switching center, a call control directive message from the prepaid service control point to cause a release of the one or more call legs for the one or more of the plurality of telecommunication devices.

20. The article of claim 15, further comprising:

means in the one or more media for sending a Transfer to Number Request message, by the originating mobile switching center and to the home location register, if there is no answer by the one or more confirmed call legs, wherein the Transfer to Number Request message comprises the pilot number and a GroupInfo parameter that indicates a NoneReachable trigger;

means in the one or more media for receiving a transfer response message, at the originating mobile switching center and from the home location register, wherein the transfer response message comprises a call forwarding no reply number for the pilot number, a calling party routing address available trigger (CgRAA), an answer trigger, and a disconnect trigger;

means in the one or more media for sending, to the prepaid service control point and in response to the CgRAA trigger, an Analyzed Information message with the call forwarding no reply number for the pilot number; and means in the one or more media for initializing a call leg to the call forwarding no reply number with the answer trigger and the disconnect trigger.

\* \* \* \* \*